United States Patent
Chavan et al.

(10) Patent No.: US 11,580,108 B2
(45) Date of Patent: Feb. 14, 2023

(54) CACHE CONSCIOUS TECHNIQUES FOR GENERATION OF QUASI-DENSE GROUPING CODES OF COMPRESSED COLUMNAR DATA IN RELATIONAL DATABASE SYSTEMS

(71) Applicant: Oracle International Corporation, Redwood Shores, CA (US)

(72) Inventors: Shasank Kisan Chavan, Menlo Park, CA (US); William Martinez Cortes, Jalisco (MX); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/537,591

(22) Filed: Nov. 30, 2021

(65) Prior Publication Data
US 2022/0083553 A1    Mar. 17, 2022

Related U.S. Application Data

(63) Continuation of application No. 16/923,352, filed on Jul. 8, 2020, now Pat. No. 11,222,018.

(60) Provisional application No. 62/897,754, filed on Sep. 9, 2019.

(51) Int. Cl.
*G06F 16/00* (2019.01)
*G06F 16/2455* (2019.01)
(Continued)

(52) U.S. Cl.
CPC .... *G06F 16/24552* (2019.01); *G06F 16/2246* (2019.01); *G06F 16/2255* (2019.01); *G06F 16/284* (2019.01)

(58) Field of Classification Search
CPC ............. G06F 16/2246; G06F 16/2255; G06F 16/24552; G06F 16/24556; G06F 16/284
See application file for complete search history.

(56) References Cited

U.S. PATENT DOCUMENTS

| 2006/0218176 A1* | 9/2006 | Sun Hsu | ............. G06F 16/2246 707/999.102 |
| 2012/0078970 A1* | 3/2012 | Matsakis | ............. G06F 16/2255 707/800 |

(Continued)

FOREIGN PATENT DOCUMENTS

WO    WO2015099562 A1    7/2015

OTHER PUBLICATIONS

Chavan, U.S. Appl. No. 16/923,352, filed Jul. 18, 2020, Notice of Allowance and Fees Due, dated Sep. 20, 2021.

(Continued)

*Primary Examiner* — Diedra McQuitery
(74) *Attorney, Agent, or Firm* — Hickman Becker Bingham Ledesma LLP; Brian N. Miller

(57) ABSTRACT

Herein are techniques for dynamic aggregation of results of a database request, including concurrent grouping of result items in memory based on quasi-dense keys. Each of many computational threads concurrently performs as follows. A hash code is calculated that represents a particular natural grouping key (NGK) for an aggregate result of a database request. Based on the hash code, the thread detects that a set of distinct NGKs that are already stored in the aggregate result does not contain the particular NGK. A distinct dense grouping key for the particular NGK is statefully generated. The dense grouping key is bound to the particular NGK. Based on said binding, the particular NGK is added to the set of distinct NGKs in the aggregate result.

20 Claims, 12 Drawing Sheets

(51) Int. Cl.
   *G06F 16/28* (2019.01)
   *G06F 16/22* (2019.01)

(56) References Cited

U.S. PATENT DOCUMENTS

| | | | |
|---|---|---|---|
| 2015/0288691 | A1 | 10/2015 | Dickie |
| 2016/0179802 | A1* | 6/2016 | Olshanetckii ....... G06F 16/2255 707/747 |
| 2017/0024435 | A1 | 1/2017 | Kociubes et al. |
| 2017/0192892 | A1 | 7/2017 | Pundir et al. |
| 2018/0011893 | A1 | 1/2018 | Kimura |
| 2018/0081939 | A1 | 3/2018 | Hopeman et al. |
| 2018/0349374 | A1* | 12/2018 | Gurajada .............. G06F 3/0653 |
| 2020/0136971 | A1* | 4/2020 | Cohen .................. H04L 9/0833 |
| 2021/0026862 | A1* | 1/2021 | Blaas .................... G06F 16/254 |
| 2021/0073233 | A1 | 3/2021 | Chavan et al. |

OTHER PUBLICATIONS

Wang, Wendy, et al., "Investigating Memory Optimization of Hash-Index for Next Generation Sequencing on Multi-Core Architecture", 2012 IEEE 26th IP&DPSW, pp. 665-674, downloaded May 13, 2021, 10 pgs.
Tirthankar Lahiri et al., "Oracle's In-Memory Database Strategy for OLTP and Analytics", Oracle Corporation, Redwood Shores, 2015.
Tirthankar Lahiri et al., "Oracle Database In-Memory: A Dual format In-Memory Database", 2015 IEEE 31st International Conference on Data Engineering, IEEE, 2015.
Prokopec et al., "Lock-FreeResizable Concurrent Tries", https://citeseerx.ist.psu.edu/viewdoc/download?doi=10.1.1.454.9595&rep=rep1&type=pdf, dated 2011, 15 pages.
Prokopec et al., "Concurrent Tries with Efficient Non-Blocking Snapshots", New Orleans, Louisiana, USA, https://www.researchgate.net/publication/221643801, dated Feb. 25-29, 2012, 11 pages.
Prokopec et al. "Cache-Aware Lock-Free Concurrent Hash Tries", École Polytechnique Fédérate de Lausanne, https://arxiv.org/pdf/1709.06056.pdf, dated Jun. 14, 2011, 14 pages.
Jonathan Lewis, "In-Memory Aggregation | Oracle Scratchpad", available: https://jonathanlewis.wordpress.com/2014/08/24/ in-memory-aggregation/, 2014.
Bagwell, Phil, "Ideal Hash Trees", https://hashingit.com/elements/research-resources/2001-ideal-hash-trees.pdf, dated 2001, 19 pages.

* cited by examiner

FIG. 7

| 0 | 8 | | | | 32 | 40 | |
|---|---|---|---|---|---|---|---|
| version code | 6 keys (4b) | | | | Base (8b) | | 6 offsets (4b) from base |

| 0 | 8 | | 24 | | 32 | | |
|---|---|---|---|---|---|---|---|
| version code | 8 keys (2b) | | Base (8b) | | | 8 offsets (4b) from base | |

| 0 | 8 | | 20 | 24 | | | |
|---|---|---|---|---|---|---|---|
| version code | 10 keys (1b) | | XX | Base(4b) | 10 pointer suffixes (4b) | | |

CACHE CONSCIOUS TECHNIQUES FOR GENERATION OF QUASI-DENSE GROUPING CODES OF COMPRESSED COLUMNAR DATA IN RELATIONAL DATABASE SYSTEMS

BENEFIT CLAIM

This application claims the benefit as a continuation of application Ser. No. 16/923,352, filed Jul. 8, 2020 by Shasank Kisan Chavan et al., the entire contents of which is hereby incorporated by reference, which claims the benefit under 35 U.S.C. § 119(e) of provisional application 62/897,754, filed Sep. 9, 2019 by William Martinez Cortes et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE DISCLOSURE

The present invention relates to dynamic aggregation of results of a database request. Herein are techniques for concurrent grouping of result items in memory based on quasi-dense keys.

BACKGROUND

Analytics and reporting are activities that involve generating summary data from database tables of many rows. Often for data summarization, rows are grouped such as for calculating subtotals and/or duplicates are suppressed. Structured query language (SQL) queries involving aggregation and group-by operators are prevalent, as they provide summary results over millions or billions of rows. Grouping aggregations are very expensive and often occur, especially in online analytical processing (OLAP) and reporting. For example, the Q1 query of the Transaction Processing Performance Council hourly throughput (TPC-H) benchmark spends much of the query time performing aggregation. At the scale of a data warehouse, efficiency of grouping or deduplication significantly affects consumption of processing time, electricity, and scratchpad memory.

A histogram may contain bins for grouping and/or deduplication of data. For example, rows of a relational table having a color column that is used as a grouping key may be sorted into grouping bins by color such as with a red bin, a blue bin, and a yellow bin. When performing aggregation into grouping bins that correspond to grouping keys that occur naturally in the grouped data, such as in a relational column, some database systems use a data structure to directly map every grouping key to its corresponding aggregation bin. For a very limited range of grouping key values, such as red, blue, and yellow, pre-allocating three bins and using natural grouping keys may be feasible. However, with a range of possible grouping key values in thousands or millions such as with numeric grouping keys, pre-allocation of bins for natural grouping keys is inefficient. If actually occurring grouping key values are sparse within the range of possible values, then pre-allocation is especially wasteful, such as when most of the bins remain unused/empty. These problems are exacerbated when the grouping key is compound, such as based on multiple columns of a relational table. A worst case may be when the natural grouping key is variable width such as with text strings of more or less unlimited length and sparsity. For example, if a VARCHAR2 column is the grouping key, then pre-allocation of bins for all possible string values might be spatially and/or temporally infeasible.

Various approaches may somewhat mitigate the problem of variable-width natural grouping keys, but only by making expensive tradeoffs. For example, a hash table for grouping may use a fixed-width hash code that is generated from a natural grouping key. However, hashing is prone to collisions between different natural grouping keys that incidentally share a same hash code. Although the intent of a hash table is access in constant time, collision resolution does not occur in constant time. Collisions and pre-allocation operate as opposing forces such as when designing a hash code width. A narrower hash code needs fewer bins, which facilitates pre-allocation in less time and space. However, the narrower hash code causes more collisions, which need more time and space to resolve. Naturally occurring uneven values distribution, such as with data skew and/or hashing bias, may increase collision frequency by an order of magnitude. Hash tables are notorious for hardware cache thrashing as discussed later herein.

Another approach for variable-width natural grouping keys uses dictionary encoded grouping keys. Encoding dictionaries are expensive to maintain. For example, populating an empty encoding dictionary requires a full table scan, and bins cannot be pre-allocated without a populated encoded dictionary

BRIEF DESCRIPTION OF THE DRAWINGS

In the drawings:

FIG. 7 is a block diagram that depicts example level based formatting of example bit fields in a bucket;

DETAILED DESCRIPTION

Figure 1:
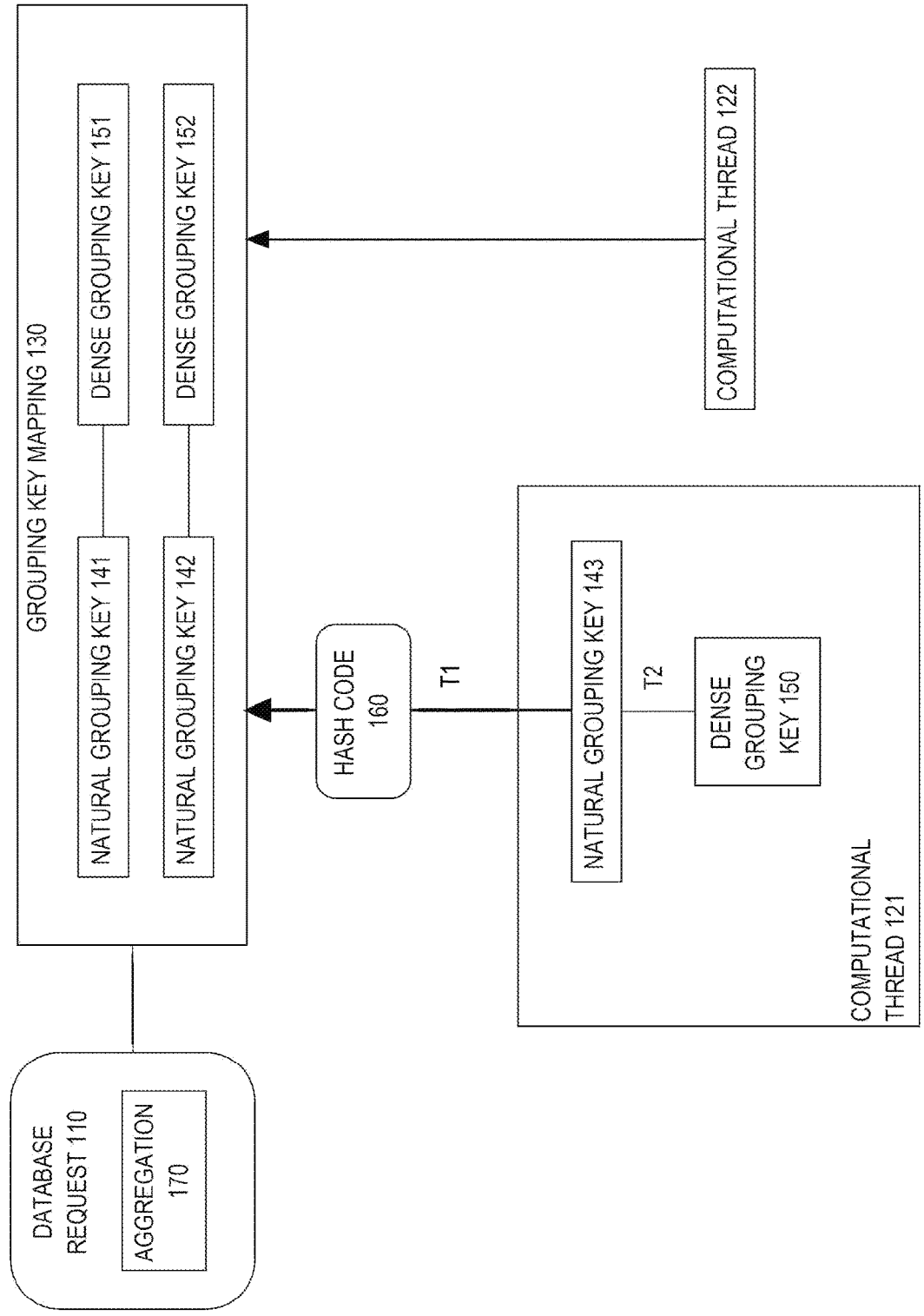
FIG. 1 is a block diagram that depicts an example database management system (DBMS) that accelerates dynamic aggregation of results of a database request by concurrent grouping of result items in memory based on quasi-dense keys.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques presented herein greatly reduce aggregation processing time, which results in better performance for analytics workloads. For internally identifying an aggregation bin, a dense grouping key (DGK) is a unique value representing a group-by result in a structure query language (SQL) query, which may be used in a database management system (DBMS) such as a relational DBMS (RDBMS) for dynamic aggregations such as group-by sum for calculating subtotals.

Herein are techniques for accelerating DGK generation in modern parallel computing systems. These techniques are consciously designed for modern central processing unit (CPU) cache structure and behavior, thereby reducing contention between CPU cores, and reducing the waiting time for accessing the main random access memory (RAM). In addition, instruction level parallelism may be used to accelerate some contentious activities.

To accelerate the aggregation, an embodiment may use DGK generation as a step before actual aggregation. Working with DGKs makes the aggregation process simpler, faster and more efficient (from memory use standpoint), but adds the additional steps of generating DGKs from the original (a.k.a natural) grouping keys, and frequently executing the reverse operation (i.e. given a DGK, obtain the associated natural grouping key). Thus, there is the problem of generating a DGK sequence (from natural grouping keys as input) as fast as possible, while having the possibility of executing the reverse operation in a fast way.

Solutions herein decompose the aggregation into two phases: the DGK generation and the aggregation itself. DGK generation is an operation that creates a bidirectional map between natural grouping keys of any type and a numerical code DGK. As its name indicates the DGK sequence is typically dense, starting in zero and sequentially growing to the last generated code. The aggregation phase uses the DGK sequence to directly access the grouping bins and compute the aggregation results faster than other solutions.

Herein are improved algorithms to achieve parallel high throughput during DGK generation. To make the DGK generation even faster, techniques herein may sacrifice the density of the generated sequence by tolerating a small number of holes (unused codes) inside the DGK sequence. The number of holes should be small enough to not affect the efficiency of aggregation, which is why this approach may be known herein as "Quasi-Dense".

The final number of groups (codes) is difficult to know beforehand, usually it is a small number, but there may be some cases with millions of groups. Techniques herein facilitate quickly generating a small amount of DGKs in an efficient way (in terms of both CPU and memory), but the proposed facilitating data structure can efficiently grow to hold a huge amount of grouping keys, taking into account that this data structure may be used while executing a query and then more or less immediately discarded.

By using this two-phased way of DGK generation followed by aggregation, combined with vector instructions applied to columnar data, improved parallel execution of the whole aggregation process can be done faster than with a "single phase" approach that lacks DGKs and relies exclusively on natural grouping keys. Splitting the aggregation into two phases has several advantages for columnar data sources, especially in modern systems with multiprocessing capabilities as follows.

Even though the DGK generation represents an additional step, the aggregation step is much faster due to: a) the use of DGKs as aggregation offsets into arrays, and b) the use of vectorization techniques on the columnar data.

DGKs may be more or less independently generated from the natural grouping values. DGKs can be computed even when the values to aggregate are not yet available (not loaded nor computed). This is especially useful in columnar stores where data from different columns are separately stored and loaded.

In a multithreaded and/or multiprocessing embodiment, each computational thread concurrently performs as follows. A hash code is calculated that represents a particular natural grouping key (NGK) for an aggregate result of a database request. Based on the hash code, the thread detects that a set of distinct NGKs that are already stored in the aggregate result does not contain the particular NGK. A distinct dense grouping key for the particular NGK is statefully generated. The dense grouping key is bound to the particular NGK. Based on said binding, the particular NGK is added to the set of distinct NGKs in the aggregate result.

1.0 Example Database Management System

FIG. 1 is a block diagram that depicts an example database management system (DBMS) 100, in an embodiment. DBMS 100 accelerates dynamic aggregation of results of a database request by concurrent grouping of result items in memory based on quasi-dense keys.

DBMS 100 may be hosted by one or more computers such as: rack servers such as blades, personal computers, mainframes, virtual computers, or other computing devices. When DBMS 100 is hosted by multiple computers, the computers are interconnected by a communication network. Examples of DBMS 100 include a relational DBMS (RDBMS) or other bulk datastore manager such as for a graph database, a NoSQL database such as a key value store, a column store such as a columnar database, a tuple store such as a resource description framework (RDF) triplestore, or a document store for documents such as JavaScript object notation (JSON) or extensible markup language (XML).

In an embodiment, DBMS 100 may cooperate with client application(s) that use DBMS 100 to store and/or retrieve data. In various embodiments, DBMS 100 may provide features such as data manipulation language (DML) such as for queries. For example, DML may provide create, read, update, delete (CRUD) operations for ad hoc access and/or batching.

DBMS 100 receives database requests, such as 110, to retrieve respective many items from storage of DBMS such as from memory, disk, or network attached storage (NAS). For example, database request 110 may be a query in the form of a DML statement such as a structured query language (SQL) SELECT statement. Database request 110 may specify, reference, or otherwise cause various aggregation operations such as DISTINCT, SORT, GROUP BY, ORDER BY, and/or JOIN.

In this example, the aggregation operation is shown as aggregation 170 that may be specified within database request 110. In other examples, database request 110 does not expressly specify aggregation 170, but execution of database request 110 otherwise causes aggregation 170 to occur. For example, aggregation 170 may be part of: a stored procedure or user defined function (UDF) that database request 110 invokes, or an execution plan that DBMS 100 generates for database request 110. In any case, implementation of aggregation operations may entail bins that can aggregate multiple items such as rows or records.

Embodiments presented herein are based on a hash table, not a histogram. With other approaches, groupings in a histogram are entirely natural. For example, records that contain a color field may be grouped, directly by value, into color bins of a histogram such as a blue bin and a yellow bin. As discussed with embodiments herein, grouping is based on hashing a natural grouping key to calculate a hash value for selecting a bucket. Herein, a bucket is not a homogenous bin of identically valued natural grouping keys. For example, blue and yellow may hash to same or similar hash values that are mapped to a same bucket as discussed later herein.

Grouping may have various uses in query processing such as sorting, subtotaling, and deduplicating, all of which the components of FIG. 1 may decrease the consumption of time and space due to dense grouping keys such as 150-152. Use of dense grouping keys is explained later herein, but in any case, there is no natural or otherwise predetermined mapping between dense grouping keys and natural grouping keys. Instead, dense grouping keys 150-152 are dynamically and individually generated on demand and dynamically bound to a respective natural grouping key when needed as follows.

In operation, DBMS 100 should dynamically populate and use grouping key mapping 130 to track: a) which dense grouping keys are already in use, and b) which dense grouping key is respectively bound to each distinct natural grouping key. Even an activity as basic as deduplicating may use grouping key mapping 130 such as discussed later herein.

In any case, grouping key mapping 130 is bijective such that: a) each natural grouping key is bound to only one dense grouping key, and b) each dense grouping key is bound to only one natural grouping key. In other words, grouping key mapping 130 maintains one-to-one bindings. For example as shown, grouping key mapping 120 tracks that natural grouping keys 141-142 are respectively bound to dense grouping keys 151-152.

Dynamic techniques herein work even when possible values for natural grouping keys are still unknown after semantically analyzing database request 110. For example, some or all natural grouping keys may need loading from disk to random access memory (RAM). Some or all natural grouping keys may not be persistent and instead need to be computed. It does not matter whether grouping key mapping 130 is used to generate an aggregate result that is an intermediate result to be internally consumed or a final result to actually be returned as an answer for database request 110.

Techniques herein facilitate horizontally scaled acceleration such as with computational threads 121-122 and/or processing cores. As explained later herein, populating grouping key mapping 130 may be multithreaded, including: a) multithreaded generation of dense grouping keys more or less without gaps in sequential values, b) multithreaded binding of natural grouping keys to dense grouping keys without sacrificing bijectivity, and c) multithreaded mutation of the internal data structures of grouping key mapping 130 without loss of coherence or consistency.

If grouping key mapping 130 already contains natural grouping key 143, then computational thread 121 should not add another binding to grouping key mapping 130 for natural grouping key 143, nor generate another dense grouping key for natural grouping key 143. Computational thread 121 should detect whether or not grouping key mapping 130 already contains natural grouping key 143.

Hashing accelerates detection of whether or not grouping key mapping 130 already contains natural grouping key 143. At time T1, computational thread 121 applies a hash function to natural grouping key 143 to calculate hash code 160 that contains a fixed amount of bits. As explained later herein, hash code 160 may contain various bit fields for detecting whether or not grouping key mapping 130 contains natural grouping key 143.

Ensuring uniqueness of natural grouping keys in grouping key mapping 130 may be more or less straightforward with sequential processing such as by single threading such as with a uniprocessor. However, techniques herein are accelerated by parallel computational threads such as 121-122, which makes guaranteeing uniqueness of grouping key mapping 130's natural grouping keys difficult as follows.

In an embodiment, computational threads 121-122 execute on a uniprocessor based on preemption or hyperthreading. In an embodiment, computational threads 121-122 execute on separate respective cores of a multicore central processing unit (CPU) for inelastic scaling with symmetric multiprocessing (SMP). In an embodiment, each of computational threads 121-122 executes on its own respective CPU, and global memory is shared.

In any case, computational thread 121 may have its own local/private storage such as registers, scratchpad memory (SPM) such as a stack, and/or hardware cache(s) such as multilevel L1-3. Thus, race conditions may occur that cause grouping key mapping 130 to contain a duplicate natural grouping key, which may be semantically erroneous and/or catastrophic. For example even without duplication, a race condition may cause grouping key mapping 130 to become structurally corrupted with syntactic problem(s) such as dangling pointer(s) and/or mangled value(s). Techniques herein prevent such problems.

When a million records that have a same postal address are sequentially processed one by one, detecting over and over again in which bin to put a current record is computationally wasteful, especially because processing sparse data such as text such as a postal address is slow. DBMS 100 uses dense grouping keys such as 150 for efficiency. Dense grouping keys are a monotonically increasing sequence of serial numbers such as integers. As explained elsewhere herein, the sequence of serial numbers may be discontinuous such that dense grouping keys are actually quasi-dense.

Each distinct natural grouping key, such as 143, has its own respective distinct dense grouping key such as 150. Grouping key mapping 130 contains bindings as pairings of a distinct dense grouping key with a respective distinct natural grouping key. Such bindings provide a one-to-one mapping between natural grouping keys and dense grouping keys. Example mapping implementations include a hash table or a lookup table. In an embodiment, the mapping is bidirectional. In a unidirectional embodiment, the natural grouping key is the lookup key.

In an embodiment and because dense grouping keys represent natural grouping keys, detecting whether or not grouping key mapping 130 already contains natural grouping key 143 may entail: a) detecting that natural grouping key 143 maps to dense grouping key 150, and b) detecting whether or not grouping key mapping 130 contains dense grouping key 150. An overview of prevention of duplicates in grouping key mapping 130, including activities at times T1-2, is as follows. Sophisticated embodiments based on a pool of natural grouping keys, a multilevel hash table of dense grouping key prefixes, cache efficient reverse mapping, and/or thread safety are presented later herein.

In an embodiment, some or all components of grouping key mapping 130 are retained even after: a) database request 110 is fulfilled, and/or b) other components of grouping key mapping 130 are discarded. Thus, some or all components of grouping key mapping 130 are reusable for future same or different database requests that have not yet occurred, as explained later herein.

2.0 Example Insertion Process

Figure 2:
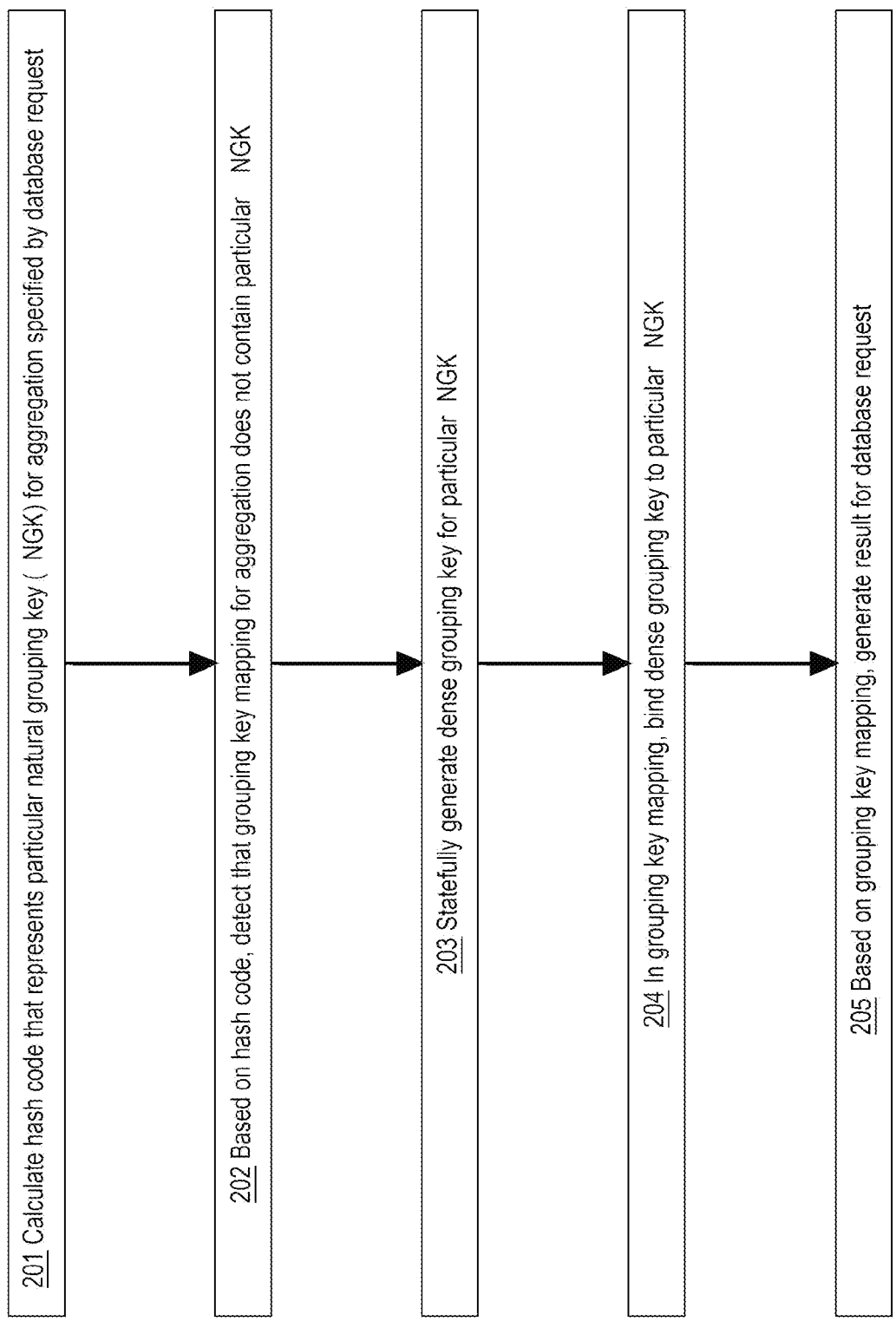
FIG. 2 is a flow diagram that depicts an example process that prevents insertion of duplicate natural grouping keys into an aggregate result.

FIG. 2 is a flow diagram that depicts an example parallel process that DBMS 100 may perform to prevent insertion of duplicate natural grouping keys into grouping key mapping 130. FIG. 2 is discussed with reference to FIG. 1. The process of FIG. 2 is initiated when DBMS 100 receives database request 110.

FIG. 2 shows processing of a single occurrence of one natural grouping key. Each of computational threads 121-122 concurrently performs the process of FIG. 2. Each thread independently runs, such that multiple threads may simultaneously perform a same or different step of FIG. 2.

There may be a backlog of natural grouping keys such that a thread that finishes processing one natural grouping key may take and process another natural grouping key from the backlog. Thus, each thread may repeat the process of FIG. 2 until the backlog clears. The backlog may be unsorted and contain duplicates. In an embodiment, each natural grouping key in the backlog occurs in a respective row of a relational table, such as with a table scan, or occurs in an intermediate result such as an internal row set. Because a table or other row set may have rows with duplicate values, the backlog may contain duplicate natural grouping keys.

In an embodiment, each thread has its own backlog or batch. In an embodiment, each thread's batch is an in memory compression unit (IMCU) that may contain one or more column vectors, regardless of whether or not the underlying database storage is row major or columnar (i.e. column major).

Backlog contents depends on database request 110 and contents of the database. For example, the backlog may be two dimensional and contain persistent rows, projected portions of rows, or computed rows. A one dimensional backlog may entail a columnar vector of natural grouping keys, either persistent or computed.

Initially, grouping key mapping 130 may be empty and contain no grouping keys. Each performance of the process of FIG. 2 by one thread: a) creates at most one dense grouping key, and b) adds at most one dense grouping key and one natural grouping key to grouping key mapping 130.

At time T1, step 201 calculates hash code 160 from current natural grouping key 143 of computational thread 121. Hash code 160 is fixed width, even if grouping key 143 is not. Hash code 160 is used as follows.

Step 202 detects whether or not grouping key mapping 130 already contains natural grouping key 143. According to embodiments later herein, detection may be tristate, yielding one of: hit (i.e. contains), miss, or false hit (which may ultimately be handled as a miss). Step 202 is thread safe, which means that only one thread can ever get a miss or false hit for a same natural grouping key 143 as explained later herein.

Step 202 may entail using natural grouping key 143 to look up dense grouping key 150 within grouping key mapping 130. If grouping key mapping 130 does not contain current natural grouping key 143, steps 203-205 occur.

Step 203 statefully generates dense grouping key 150 for current natural grouping key 143. Stateful generation is special and not performed by other aggregation approaches that statelessly generate a value such as a hash code. Stateful means that which dense grouping key is generated depends on when it is generated.

For example when many new and distinct natural grouping keys, including natural grouping key 143, are processed iteratively or in parallel, the value of dense grouping key 150 may depend on whether natural grouping key 143 is processed sooner or later, such as first or last. Even racing by threads 121-122 may affect stateful generation as explained later herein.

Whereas, stateless generation has no such behaviors, and those behaviors may be special and/or beneficial as explained later herein. A naive stateful embodiment may directly and contentiously share a global counter. Efficient parallel embodiments later herein instead indirectly share the global counter in a way that mostly eliminates coordination overhead.

At time T2, step 204 binds dense grouping key 150 to natural grouping key 143 in grouping key mapping 130. As shown in FIG. 1, multiple threads may simultaneously read and/or write such associations which, as discussed later herein, may need a data structure that is thread safe or otherwise protected such as with locking.

After step 204 may be additional processing for current natural grouping key 143, which is the same processing as when step 202 detects a hit and skips steps 203-204. For example, that additional processing may: a) add a current item, which may contain current natural grouping key 143, to a bin in an aggregate result, or b) increment a counter in that bin. All items in a same bin have a same natural grouping key and thus a same dense grouping key. Bins may be identified by dense grouping keys as tracked in grouping key mapping 130.

Based on grouping key mapping 130, step 205 generates a result for database request 110. In one example, the result is a final result that answers database request 110. In another example, the result is instead an intermediate result such as an internal row set that is needed for generating a final result based on additional processing.

3.0 Example Result Aggregator

Figure 3:
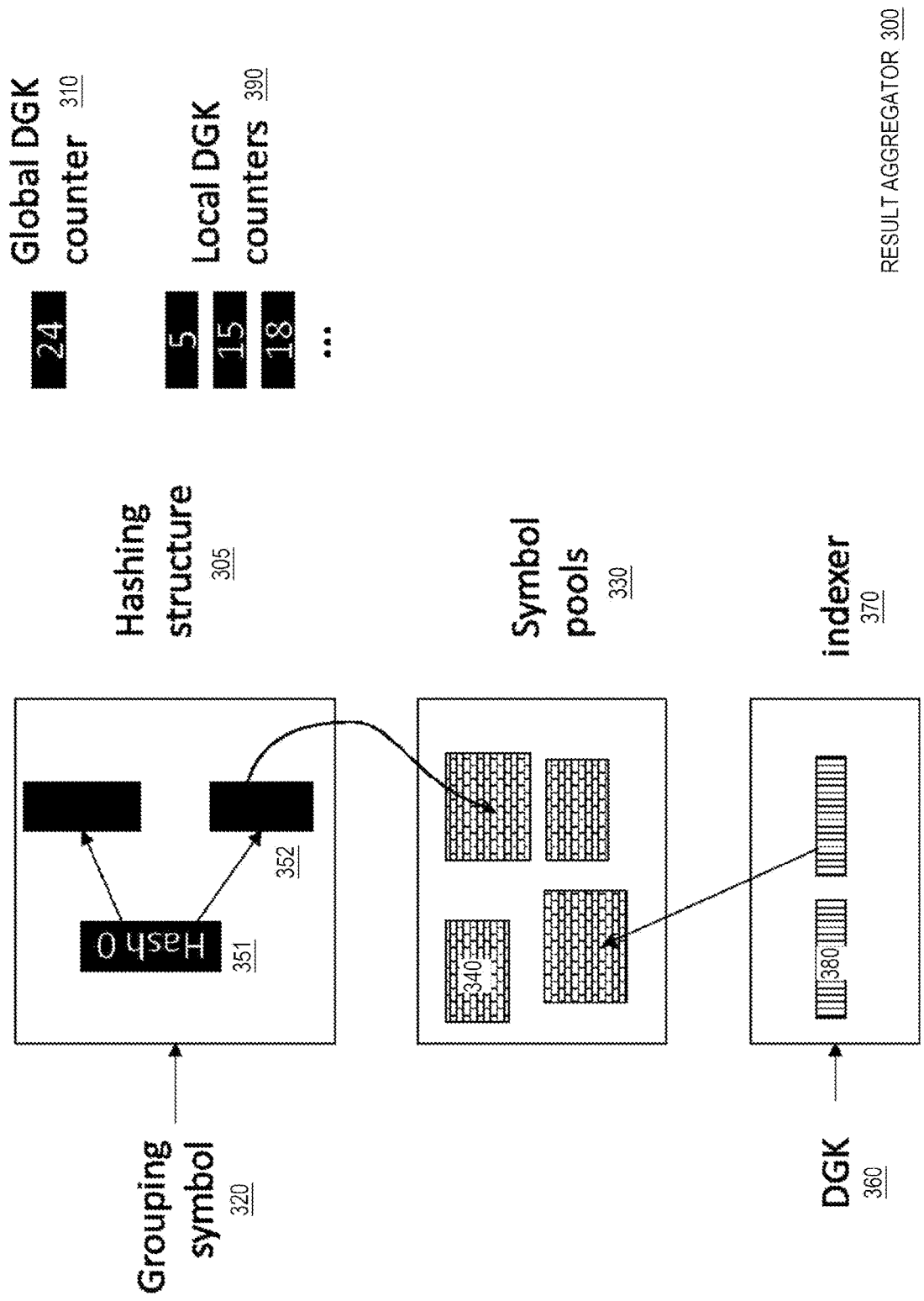
FIG. 3 is a block diagram that depicts an example result aggregator that contains a hashing structure.

FIG. 3 is a block diagram that depicts an example result aggregator 300, in an embodiment. FIG. 3 is discussed with reference to FIGS. 1-2. In an embodiment, result aggregator 300 performs the process of FIG. 2. In an embodiment, DBMS 100 of FIG. 1 contains result aggregator 300.

In an embodiment, grouping key mapping 130 is more or less a passive container of data. In an embodiment, hashing structure 305 is an implementation of grouping key mapping 130. Hashing structure 305 resembles a logical tree and contains tree nodes such as root node 351 and leaf node 352. An example abstract data type (ADT) for implementing hashing structure 305 is presented later herein.

One purpose of hashing structure 305 is to designate an unordered set of distinct natural grouping keys such as 320. However and as explained later herein, hashing structure 305 does not directly contain natural grouping keys. Instead, some or all tree nodes may contain one or more pointers to respective natural grouping keys that are stored in symbol pools 330, which is discussed later below.

The tree nodes of hashing structure 305 are arranged into at most a predefined amount of levels. Initially, hash structure 305 contains only root node 351 that is empty. As hashing structure 306 accumulates distinct natural grouping keys, hashing structure 306 may grow additional tree nodes. So long as the distinct natural grouping keys are few, additional tree nodes are unneeded and might never be needed.

An older tree node may have zero or more link pointers to respective newer tree nodes in a next level. Growth of new levels and tree nodes are discussed later herein. Every tree node also contains one or more symbol pointers that point to respective natural grouping keys stored in symbol pools 330.

Symbol pools 330 contains individual pools such as 340. Individual pools need not be adjacent in memory. Individual pools may have different sizes. Individual pools do not reference each other. Each individual pool is self contained. Although symbol pointers may point into symbol pools 330 from outside, symbol pools 330 itself does not contain any pointers.

Individual pool 340 contains bindings as pairings of a distinct dense grouping key with a respective distinct natural grouping key. Because natural grouping keys may have varied sizes, such as text strings of variable length, bindings are unaligned and densely packed. Random access to a particular binding requires the memory address of the binding such as with a pointer.

Hashing structure 305 and symbol pools 330 may be used together to look up a dense grouping key given a natural grouping key. For example and as explained later herein, hash code 160 of natural grouping key 143 may be used to navigate hashing structure 305 by descending from root node 351 to tree node 352 that contains a symbol pointer to a binding in symbol pools 330 that binds natural grouping key 143 to dense grouping key 150.

If hashing structure 305 does not contain natural grouping key 320, then neither does symbol pools 330. Adding natural grouping key 320 to hashing structure 305 entails adding, to an individual symbol pool of symbol pools 330, the binding of natural grouping key 320 with dense grouping key 360. Although all threads can read all individual symbol pools, in an embodiment that completely avoids mutation contention in symbol pools 330 and reduces L1 cache coherency traffic, a thread only inserts a binding into an individual symbol pool that the thread itself allocated and/or owns, as explained later herein.

Reverse lookup of a natural grouping key given dense grouping key 360 uses indexer 370. Although not shown as such, indexer 370 may resemble a logical tree and contains tree nodes such as 380. Although both of indexer 370 and hashing structure 305 resemble logical trees, they have different architectures as follows and as explained later herein.

Every tree node in hashing structure 305 has at least one symbol pointer that points to a binding within symbol pools 330. Whereas, only leaf nodes of index 370 have one or more pointers to respective bindings within symbol pools 330. Hashing structure 305 uses a hash code such as 160 as a lookup key.

Whereas, indexer 370 uses a dense grouping key such as 360 as a lookup key. The combination of hashing structure 305, symbol pools 330, and indexer 370 achieves a bidirectional mapping between natural grouping keys and dense grouping keys.

Adding a natural grouping key to symbol pools 330 entails a binding with a newly generated dense grouping key. Multiple computational threads 121-122 may concurrently generate new dense grouping keys, which are serial numbers as explained earlier herein. Each computational thread may maintain its own local counter for generating a continuous short subsequence of serial numbers by repeatedly incrementing by one.

Collectively those local counters are local dense grouping key (DGK) counters 390. With careful management as follows, each serial number can only be generated by one local counter and only once. As follows, each local counter periodically uses global DGK counter 310 to reserve a next available subsequence of serial numbers.

Multithreaded use of global DGK counter 310 may be contentious. A race condition may corrupt global DGK counter 310. Thus, global DGK counter 310 should be protected for thread safety.

In an embodiment, global DGK counter 310 is protected by an atomic instruction such as fetch-and-add. In other words, underlying hardware and its dedicated atomic instruction of an instruction set architecture (ISA) can provide thread safe and simultaneous reading and adjustment of global DGK counter 310 by a same thread in the presence of other threads that contentiously race to atomically read and adjust global DGK counter 310.

Whatever value a thread reads from global DGK counter 310, the thread resets its own local counter to that value. Fetch-and-add should not implicitly increment by one, but should instead increment by more than one, as specified by an operand of the fetch-and-add instruction. In an embodiment, different threads may specify different increment amounts.

In an embodiment, a same thread may specify different increment amounts at different times. In an embodiment, all threads always specify a same increment amount. Whatever increment amount a thread specifies, that is how many serial numbers the thread can generate and how many times the thread should increment its local counter before reading global DGK counter 310 again.

Instead of an atomic instruction, an embodiment may use a memory synchronization instruction such as a barrier instruction of an ISA, such as a fence instruction that flushes (i.e. write back) to global memory and/or reloads, into local memory of each thread or processing core, some or all shared data. An advantage of an atomic instruction such as fetch-and-add is that synchronization is non-blocking for higher throughput. Blocking synchronization may instead be used, such as with a mutex or semaphore, such as with a critical section.

4.0 Example Pipeline

Figure 4:
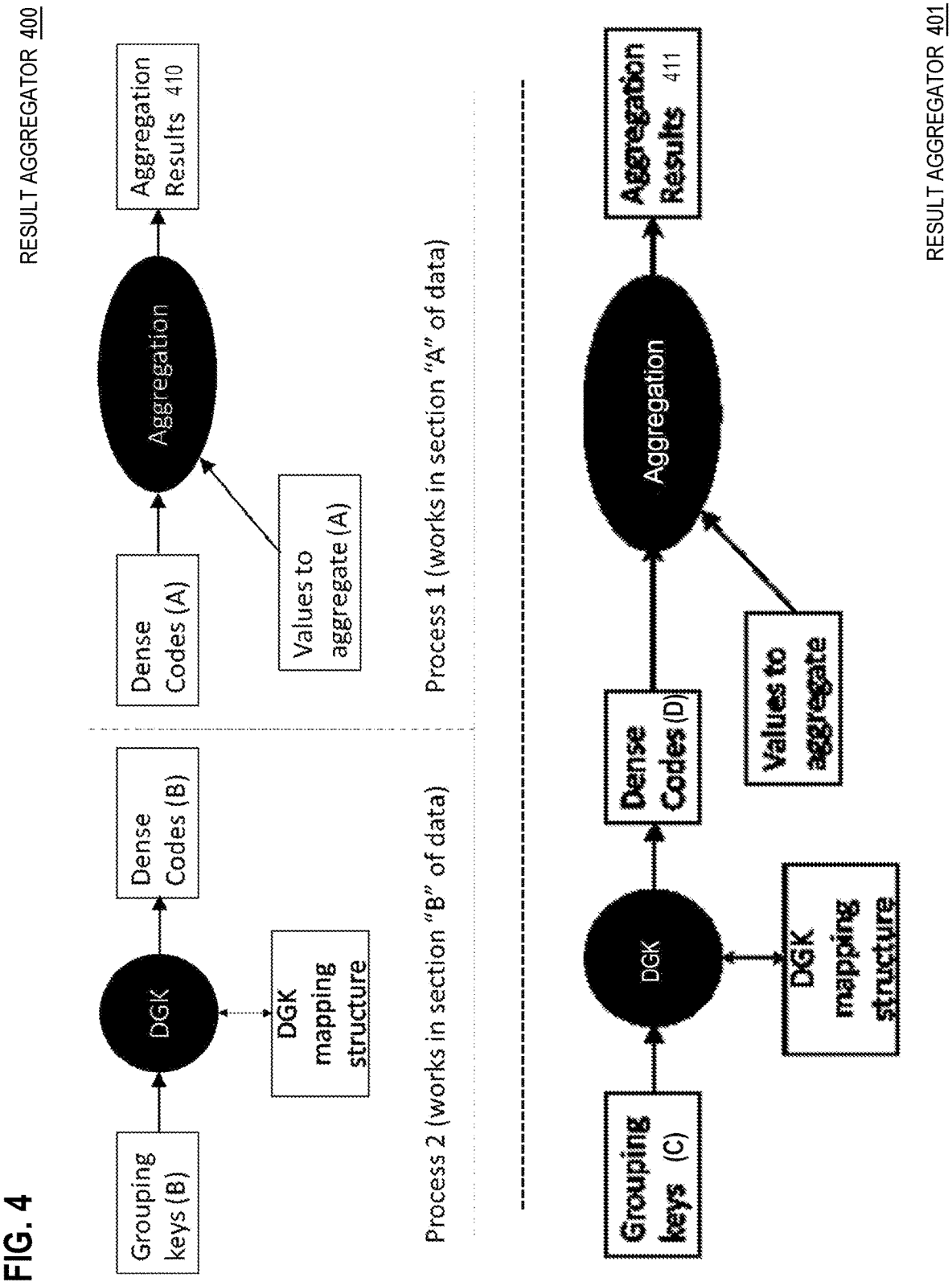
FIG. 4 is a block diagram that depicts an example pipeline for aggregating result data.

FIG. 4 is a block diagram that depicts an example result aggregator 400, in an embodiment. FIG. 4 is discussed with reference to FIGS. 1-2. In an embodiment, result aggregator 400 performs the process of FIG. 2. In an embodiment, DBMS 100 of FIG. 1 contains results aggregators 400-401 that are separate embodiments shown together for comparison as follows.

Result aggregator 400 contains differently specialized processes 1-2 that populate aggregation result 410. Processes 1-2 may be decoupled and/or pipelined as follows. In embodiments, pipelining may or may not be asynchronous, with or without sharing a same operating system (OS) process, lightweight (i.e. green) thread, CPU, and/or CPU core. An embodiment may buffer and/or individually process or batch process any of: natural grouping keys B, dense grouping keys A and/or B, values to aggregate A, and/or aggregation results 410.

Process 1 that performs a second stage of the pipeline is downstream of process 2 that performs a first stage. In one scenario, consumed dense grouping keys A are produced as dense grouping keys B. In a synchronous single threaded and statically linked embodiment such as result aggregator 401, there are four sequential steps a-d for repetition: a) a dense grouping key provider, shown as DGK, consumes one or more natural grouping keys C and b) maps those natural grouping keys to one or more dense grouping keys D, and c) an aggregation builder, shown as aggregation, consumes those dense grouping keys and d) uses them to populate aggregation results 411.

In an embodiment, multiple instances of a same or different database request(s) are processed simultaneously or not. Each database request instance has a separate or shared same instance of process 2. An instance of process 1 should not be shared. For example, a shared instance of process 2 may dynamically switch between multiple instances of process 1 based on which database request submitted current natural grouping keys B.

5.0 Example Multilevel Hash Table

Figure 5:
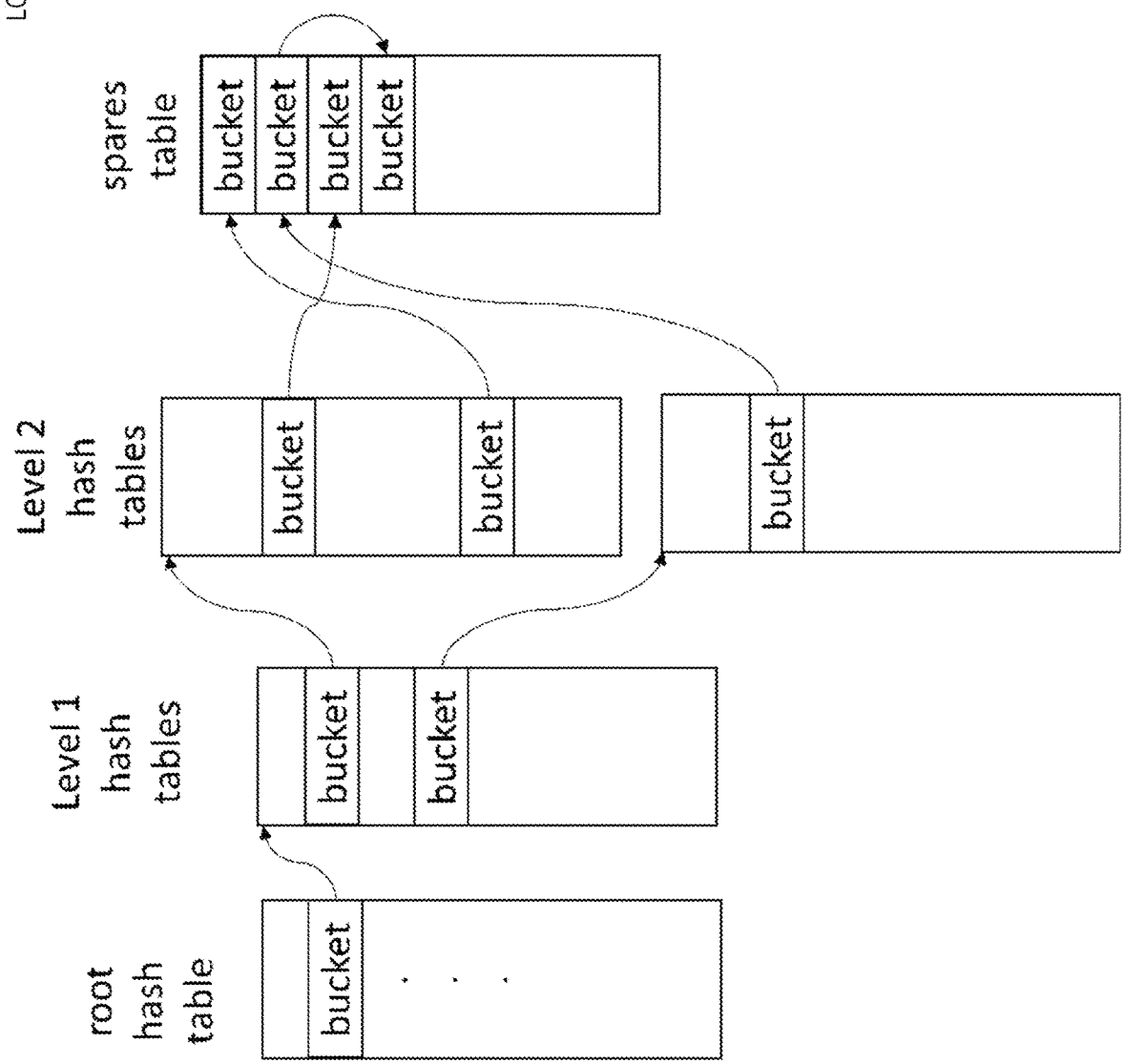
FIG. 5 is a block diagram that depicts an example multilevel hash table.

FIG. 5 is a block diagram that depicts an example logical tree 500, in an embodiment. FIG. 5 is discussed with reference to previously presented figures. In an embodiment, logical tree 500 is an implementation of hashing structure 305 of FIG. 3.

Logical tree 500 is a multilevel hash table, which is a hierarchy of individual hash tables that are arranged in levels root, spare, and 1-2. Logical tree 500 initially contains only the root hash table and individually adds other hash tables when needed. Logical tree 500 contains at most a predefined amount of levels, except that the spares table may consolidate multiple levels as explained below.

Depending on the embodiment, each hash table contains an array of a same or different fixed amount of buckets. A bucket may or may not contain a link pointer to a hash table in a next level of logical tree 500.

A hash code, such as 160, of a natural grouping key may be used as a lookup key into logical tree 500 for retrieving a dense grouping key. Each hash code has a same fixed amount of bits. The hash code is processed as a list of identically sized indexing bit fields for use as bucket array indices.

Starting at the root hash table and at each level of logical tree 500, a next indexing bit field of the list of indexing bit fields of the hash code is used as a bucket array index to select a bucket in a current hash table. If the natural grouping key is not found in the bucket and the bucket contains a pointer to a next hash table, then the next hash table is iteratively or recursively processed as a current hash table. Thus, the indexing bit fields of the hash code guide descent through the levels of logical tree 500 for a natural grouping key.

As discussed later herein, logical tree 500 may grow new levels, such as level 1, up to a maximum amount of levels such as level 2. Unlike other multilevel hash tables, logical tree 500 can continue to grow to accommodate more content, even when logical tree 500 already has a maximum amount of levels. Such continued growth is based on the spares table as shown. Unlike in other hash tables, a bucket in the spares table may or may not contain a link pointer to another bucket in a same or different spares table. Thus, the bucket may be part of at most one linked list of buckets, and there may be multiple such lists. When a spares table overflows, another spares table (not shown) is added.

6.0 Level Based Interpretations Of Bit Fields

Figure 6:
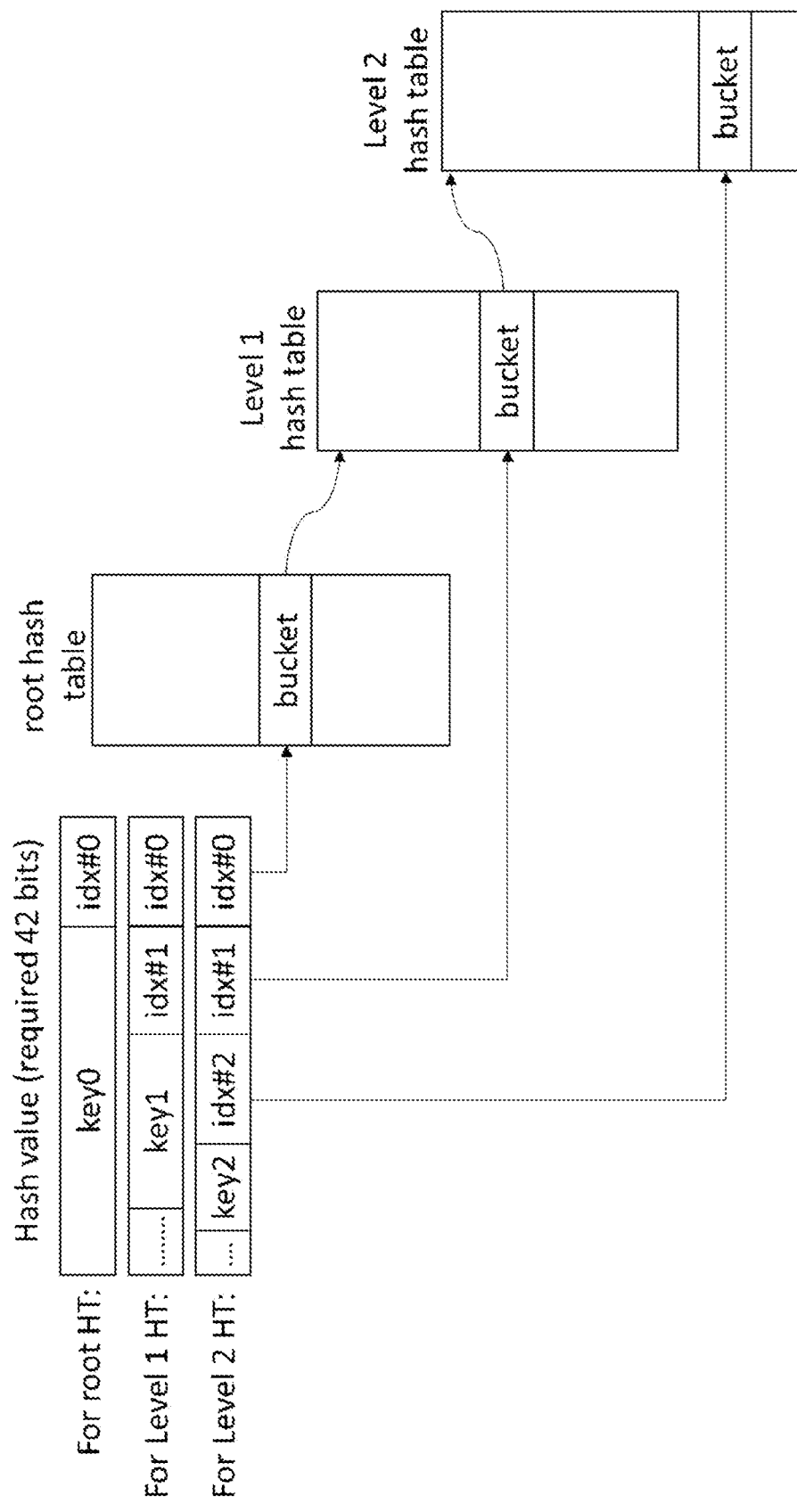
FIG. 6 is a block diagram that depicts example level based interpretations of example bit fields in a hash code.

FIG. 6 is a block diagram that depicts level based interpretation of example bit fields of a hash value for descending into logical tree 500, in an embodiment. FIG. 6 is discussed with reference to previously presented figures.

Indexing bit fields in the hash value are shown as idx 0-2. At each level of logical tree 500, a different indexing bit field is used to select a bucket in a current hash table. Idx 0 selects a bucket in the root hash table. Idx 1 identifies a bucket in a level 1 hash table, and so forth for as many levels as logical tree 500 has.

At any level of descent into logical tree 500, there may be some amount of not yet used indexing bit fields. For example at level 1, idx 0-1 were or are being used, and idx 2 still is unused. In the shown embodiment, bits in such unused indexing bit fields are repurposed until needed when the relevant level is reached. In an embodiment not shown, decomposition of a hash value into bit fields is not dependent on tree level.

Such repurposed bits are included as shown in a relevant portion of the hash value, shown as keys 0-2. For example, bit(s) that are unused in key1 as shown may be incorporated in key(s) for other levels such as key2. In the same way that logical tree 500 has a sequence of levels, keys 0-2 are (overlapping as explained below) portions of the hash value that are used in sequence to descend through the tree levels.

Because each subsequent level has fewer unused (i.e. not already used to descend through previous tree levels) indexing bit fields, there may be fewer bits remaining for keys. Thus, the width of the current key gradually shrinks during descent into logical tree 500. For example key 0 is wider than key 1.

Thus, how the hash value is divided into bit fields depends on which is a current level of descent into logical tree 500. For example, a particular bit may be part of one bit field at one level but part of a different bit field at a different level.

Herein, linear scanning is repeatedly presented for various arrays. Later herein parallel scanning by hardware for same scenarios is presented for acceleration as an implementation alternative.

As explained later herein, keys 0-2 are used for linearly scanning respective buckets in respective hash tables of respective levels for partial matches that may be true or false positives/hits. The wider is the key, the less likely is a false positive. Likewise, the deeper is the level, the less likely is a false positive due to having already matched keys of earlier levels.

Thus, deeper levels perform well even with shorter keys. To save memory, an embodiment may impose additional key shrinkage at each level, shown as ellipses to the left of keys 1-2. In an embodiment, the ellipses indicate additional bits upon which DBMS 100 may impose other purpose(s) because small keys do not need those bits. In an embodiment, a more significant way to conserve volatile memory is a multilevel hash table arranged as a directed acyclic graph as discussed later herein.

7.0 Example Buckat Formats

FIG. 7 is a block diagram that depicts level based formatting of example bit fields in a bucket in logical tree 500, in an embodiment. FIG. 7 is discussed with reference to previously presented figures.

In the shown embodiment, each level of logical tree 500 has its own bucket format, even though all buckets in logical tree 500 have a same width. FIG. 6 shows three bucket formats. The top format applies to buckets in the root hash table of logical tree 500. The middle format applies to level 1 buckets, and so forth.

Embodiments not shown may have other bucket formatting schemes such as follows, A less complex embodiment uses the bottom format for all levels but may have more false positives, especially in the root level. An intermediate approach is to use the middle format instead for the root level and the bottom format for all other levels.

As explained earlier herein, each level of logical tree 500 may contain one or more hash tables, except the root level that only has one root hash table. For example as shown in FIG. 5, level 1 has one hash table, and level 2 has two hash tables. A hash table never changes tree levels, which has various implications such as follows.

The format of a bucket is immutable. Logical tree 500 only grows downwards on the margins (i.e. leaves) such that a new hash table should not be inserted in between two hash tables, in adjacent tree levels, that are linked as follows. Every bucket contains a link pointer to a next hash table in a next tree level. That link pointer is unassigned (e.g. zero or null) until the hash table overflows with too many key prefixes as explained later herein. Once assigned, the link pointer should not be reassigned.

A consequence of hash tables not changing levels is that logical tree 500 does not rebalance, which typically is a limitation that degrades performance. Natural grouping key values occurring without data skew and an unbiased hash function: a) optimize performance of each hash table in logical tree 500, and b) maximize balance in the dynamic shape of logical tree 500. However, if skew or bias in data or hashing occurs, the special design of logical tree 500, as described herein, can mitigate such bad effects better than other hash table approaches. For example, the multilevel aspect of logical tree 500 may confine such distortions to a single level of the tree or even a single hash table of many in a same level such that nearly all tree levels and most hash tables in the tree still maintain optimality even under adverse data and hashing conditions. In other words, logical tree 500 is robust by design.

However, the architecture of logical tree 500 is biased for usage that includes mostly insertions of natural grouping keys (i.e. symbol pool bindings), few reads except during insertion, and no removals or revisions of symbol pool bindings already inserted. In that case, rebalancing would reduce throughput. Thus, logical tree 500 has very low latency worst case and average case insertions. This helps make logical tree 500 scalable and predictable, which may be important to DBMS 100. Besides being optimized for insertion, logical tree 500 also provides fast lookups after population finishes. For example, logical tree 500 is fast during build and probe phases of a hash table lifecycle generally. Logical tree 500 can be frequently probed without excessive latency.

FIG. 7 shows details of various bit fields in a bucket. The version bit field is explained later herein.

As shown, a bit field width may be multiple bytes. For example, a four byte field is shown as (4b) and so forth, which according to the embodiment may or may not imply byte alignment, and some or all bit fields may be bit packed (i.e. unaligned). If a bit field is an array, then (4b) indicates that each array element has four bytes. For example, 6 keys (4b) indicates an array that is 24 bytes wide and contains six elements.

Each format contains multiple keys that are portions of hash codes for natural grouping keys already in logical tree 500. Amount and width of key portions in a bucket depend on the tree level. Deeper levels have more and smaller portions of keys.

Because the keys are stored as an unsorted array within the bucket, detecting a miss or a possible (e.g. false) hit for a natural grouping key entails linearly scanning the key array for a match. If a key in the bucket matches, then the relative position of the key in the key array is used as a same relative position into a pointer array or offset array in the bucket. For example, a fifth key in the key array corresponds to a fifth pointer in the pointer array. Pointers in the pointer array are compressed such that an element in the pointer array is a pointer suffix, which are the least significant bits in a pointer. A pointer array and an offset array are contrasted later herein.

The most significant bits of the pointer are provided by the base bit field, which is shared for all suffixes in the pointer array. For example, base (4b) as shown has four bytes. Bitwise concatenation, such as by bitwise OR, combines the base and the suffix into a memory address pointer that points to a binding in symbol pools 330 as explained earlier herein. Thus, symbol pointers are compressed to save space, which keeps buckets small.

In an embodiment, a bucket is no wider than a cache line in a hardware cache such as an L2 cache of a CPU and/or an L1 cache of a core of a multicore CPU. Thus, a bucket is a cacheable unit whose temporal locality of repeated use provides acceleration.

In an embodiment, computer 100 is an Oracle Exadata Database Machine with multiple Intel Xeon multicore CPUs that have L1-3 hardware caches, all having a same 64 byte cache line width. Xeon memory addresses and pointers are eight bytes wide.

Such Xeon widths may be exemplary for embodiments elsewhere herein, which has various implications such as: a) a cache line may exactly store eight whole pointers, b) cache line alignment of data elements such as buckets allows least significant address bits to be identical for many or all of those elements, c) such that those least significant bits may be implied and not actually stored, which facilitates d) pointer truncation to save space as explained herein, and e) repurposing of truncated bits for concerns unrelated to addressing.

The Xeon instruction set architecture (ISA) has convenient instructions for direct management of hardware cache(s) and/or particular cache line(s) such as for coherency between cache and memory and/or consistency with other caches. In other words, reading or writing data structures herein that are readily cache line aligned may also be directly and atomically coherent and consistent (i.e. synchronized) due either to Xeon hardware cache semantics or convenient Xeon instructions for cache, memory, and/or synchronization. Rival hardware may have similar functionality.

In an embodiment and depending on tree level is either a pointer array that contains pointer suffixes or an offset array that contains offsets, as shown, which operate differently as follows. A pointer suffix or an offset are different ways to reference a key binding in symbol pools 330.

An offset is not a pointer suffix nor any part of a pointer. When used with an offset bit field, the base bit field contains a prefix of a pointer whose least significant bits are implied as zero because, in an embodiment and as introduced above, each bucket fits in a cache line and so may be cache line aligned. That pointer points to or into an individual pool, such as 340, in symbol pools 330. The pointer may be treated as a pointer to an array of key bindings.

The offset bit field is used for indexing into that array. If an embodiment allows the pointer to point into the individual pool instead of at the start of the individual pool, then referencing the first binding in the individual pool would need a negative offset. Depending on the embodiment, the offset is treated as numerically signed or unsigned.

In an embodiment, a hash table's data such as the key array and the link pointer to next hash table are arranged in memory with the key array stored first. Thus, the memory address of the key array and the hash table are the same as the first key in the key array, which is cache line aligned.

Thus, a whole individual hash table also is cache line aligned, even if that hash table is wider than a cache line. Thus, least bits of the memory address of the hash table may always be zero and may be implied. Thus, an offset may be narrower than a pointer suffix even though either may be used to reconstruct a whole memory address as a pointer of a same actual width.

8.0 Example Pointer Linkage Between Buckets

Figure 8:
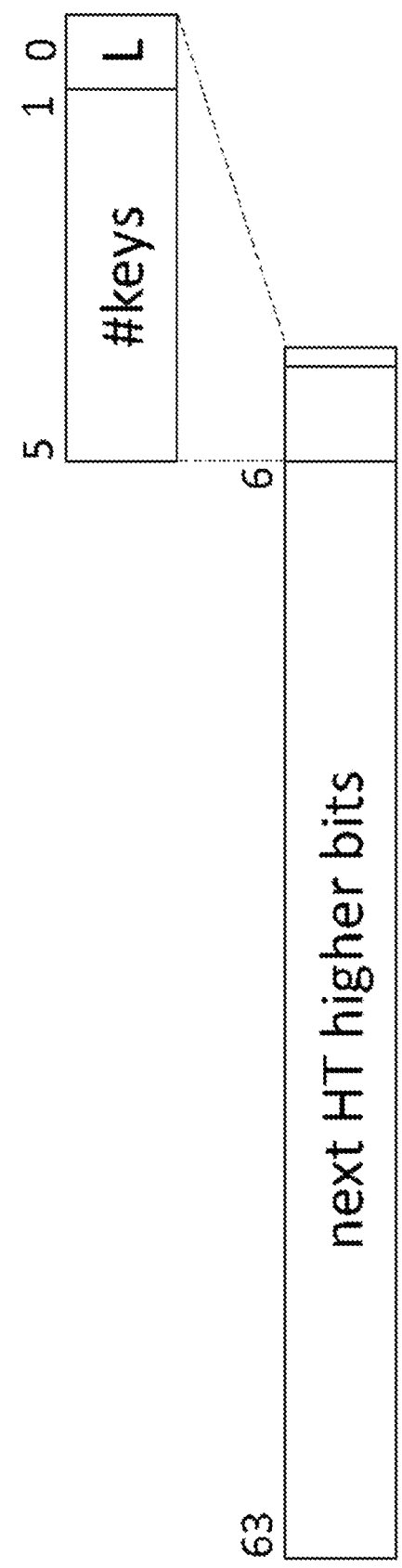
FIG. 8 is a block diagram that depicts example bit fields of a pointer that links a bucket in a hash table in one level of a logical tree to a next hash table in a next level.

FIG. 8 is a block diagram that depicts example bit fields of a pointer that links a bucket in a hash table in one level of logical tree 500 to a next hash table in a next level, in an embodiment. FIG. 8 is discussed with reference to previously presented figures. The 64 bits shown in FIG. 8 may be the eight byte version code shown in FIG. 7. Incrementation of #keys of FIG. 8, as discussed below, also is incrementation of the version code of FIG. 7. In the shown embodiment, incrementation of #keys by one also is incrementation of the version code by two. In this embodiment, there are primarily even version numbers such that an odd version number indicates that the previous even version number is still the current version that is currently locked.

The key array of hash code prefixes in FIG. 7 provides the capacity of a bucket. Initially the key array is empty. When a new natural grouping key is inserted into logical tree 500, tree descent and bucket selection based on portions of the hash code of the natural grouping key may stop at a bucket that is empty because its key array is empty, which is one example of a miss.

A prefix or other portion of that hash code is inserted into the bucket by storing the prefix in the first element of the key array. Miss processing also includes: generating a new binding in symbol pools 330, and storing a pointer suffix of the new binding in the pointer array of the bucket.

When a second new natural grouping key arrives at the bucket but with a new prefix, the key array is linearly scanned for the new prefix but not found, which is another example miss. The new prefix is stored in the linearly next available element of the key array.

A false hit that actually is a miss occurs during a collision when two different natural grouping keys, one new and one already stored, have respective same or somewhat similar hash codes that share a same prefix. The corresponding pointer in the pointer array may be used to examine the corresponding binding in symbol pools 330 by comparing dense grouping keys or natural grouping keys to detect that the new natural grouping key actually is new and not a duplicate. If such a prefix collision is confirmed as a false hit, then insertion of the new natural grouping key should occur in an implementation dependent way. In an embodiment, a duplicate prefix is inserted into the bucket. In another embodiment, the collision is handled as if the bucket were overflowing even if it is not actually overflowing, which is as follows.

A bucket may gradually fill with key portions. The bucket overflows only when all of the following conditions simultaneously occur: the key array is already full, and the key array does not contain the new prefix. In that case or if a false hit is detected, the link pointer may, if still unassigned, become assigned to another hash table as a next hash table in a next tree level. In most cases, that next hash table is new and empty when the link pointer is being assigned. In some embodiments or scenarios such as when conserving volatile memory, the next hash table is reused and not empty. In other words, an embodiment may have a same next hash table that is shared by multiple hash tables in a previous level. In that case, logical tree 500 is a directed acyclic graph (DAG) instead of a tree. Regardless of whether the link pointer was already assigned or only now assigned, the new prefix is inserted or otherwise processed at a hash table in the next tree level that the link pointer points to.

A hash table is empty when all of its buckets are empty. In an embodiment, the #keys bit field is initially zero when a bucket is empty. In an embodiment, a hash table is full when #keys indicates a sufficient count of prefixes already stored in the bucket. Each prefix insertion increments #keys by one. In an embodiment, prefix insertion by one computational thread is detected by another thread by observing #keys mutation.

Logical tree 500 is highly scalable in time or space in two ways: capacity growth by additional hash tables, and horizontal acceleration (e.g. multithreading). Concurrent readers lack contention. Reading entails activities such as tree descent, linear scanning the key array of a bucket, and/or traversing a symbol pointer to a binding in symbol pools 330.

Those reading activities use data structures that may be contentious due to simultaneous insertion activities on those data structures by another thread. That is, mutation of various bit fields of a bucket might not be inherently thread safe. Thus, a writer should lock a bucket until all mutation for an insertion is complete, and other writers should respect the lock as follows.

In an embodiment, the lock in a bucket is shown bit L that requires protective synchronization: a) inherently by hardware cache coherency and memory semantics, b) by atomic instruction(s) of an instruction set architecture (ISA), or c) software semantics such as a mutex, semaphore, or critical section. In an embodiment, test-and-set is an atomic instruction that simultaneously reads and sets bit L. Particular atomic instructions are presented later herein.

The lock is already held when bit L is already set. In an embodiment when a reader or writer thread observes that the lock is already held, the thread may spin until bit L clears, which entails repeatedly checking bit L in a tight loop. In an embodiment, each iteration of the loop includes a fixed or increasing amount of sleeping. In an embodiment, readers do not spin, block, or otherwise wait for bit L to clear.

In an embodiment, a bucket has at most 64 or 128 bytes such as to match the size of a hardware cache line. In an embodiment, protective synchronization is unneeded when clearing bit L to release the lock.

9.0 Example Indexer

Figure 9:
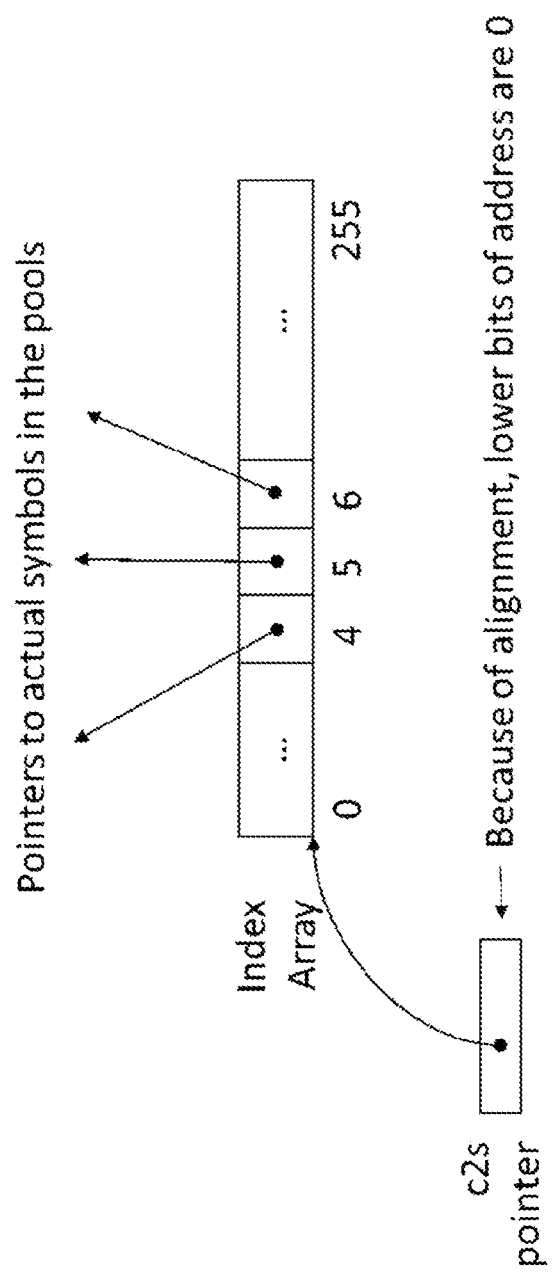
FIG. 9 is a block diagram that depicts an example indexer into which few natural grouping keys have been inserted so far.

FIG. 9 is a block diagram that depicts an example indexer into which few natural grouping keys have been inserted so far, in an embodiment. FIG. 9 is discussed with reference to previously presented figures. The c2s pointer is explained later herein.

Both of the indexer and logical tree 500 of FIG. 5 contain symbol pointers to bindings in symbol pools 330 of FIG. 3. Logical tree 500 is used with a natural grouping key for looking up a dense grouping key in symbol pools 330. The indexer accepts a dense grouping key for looking up a natural grouping key in symbol pools 330. Logical tree 500 is used with a hash code of a natural grouping key for hashing. The indexer uses a dense grouping key more or less directly and in a way somewhat similar to a hash code.

The indexer has a lifecycle with two phases. Initially and so long as only a few dense grouping keys are inserted into the indexer, the indexer operates with a single index array as explained below. When too many dense grouping keys are inserted, the indexer operates with a two level tree of index arrays.

In an embodiment, the tree may grow more than two levels, such that the leaves row of index arrays always remains the last level of the tree. In other words, the tree grows new levels at its root, which means that the tree can repeatedly grow a new root, and the old root ceases to be a root, despite remaining in the tree, as explained later herein.

In an embodiment, the tree should not grow a third level, and the maximum capacity of the indexer is fixed. In that embodiment, increasing the maximum capacity requires larger index arrays, not more levels. Index array size is fixed when the indexer is created. In any embodiment, maximum capacity is also limited by the maximum possible dense grouping key value, which depends on dense grouping key width.

Each element of an index array contains a whole memory pointer, and there is no need to concatenate a base and suffix. If an index array is in the second level or is the only index array, then each of its pointers points to a distinct binding in symbol pools 330.

Initially, the indexer contains only a single empty index array. An index array is empty when all of its elements are zero or null. When a new dense grouping key is inserted into the index array, array element selection is based on a first portion of the dense grouping key.

Thus for an empty indexer that contains no dense grouping keys, the first portion of the new dense grouping key is used as an offset that selects an element in the empty index array of the tree root in which to store the symbol pointer that points into symbol pools 330 for the new dense grouping key. More pointers may be inserted into the tree root in the same way. In other words, there is no linear scanning or filling of the index array. Random access of index array elements occurs instead.

A logical collision would occur if two different dense grouping keys selected a same element of the index array based on their respective first portions having a same value. However this is prevented and/or accommodated as follows. Each index array has its own distinct range of dense grouping key values that the index array can potentially store.

The respective ranges of different index arrays do not overlap. As explained earlier herein, global DGK counter 310 of FIG. 3 more or less ensures that dense grouping keys are sequentially generated, starting at zero. When the indexer has only one index array, insertion of a dense grouping key whose value exceeds the capacity of the index array causes the indexer lifecycle to transition to a two level tree of index arrays as follows.

10.0 Example Indexer Growth

Figure 10:
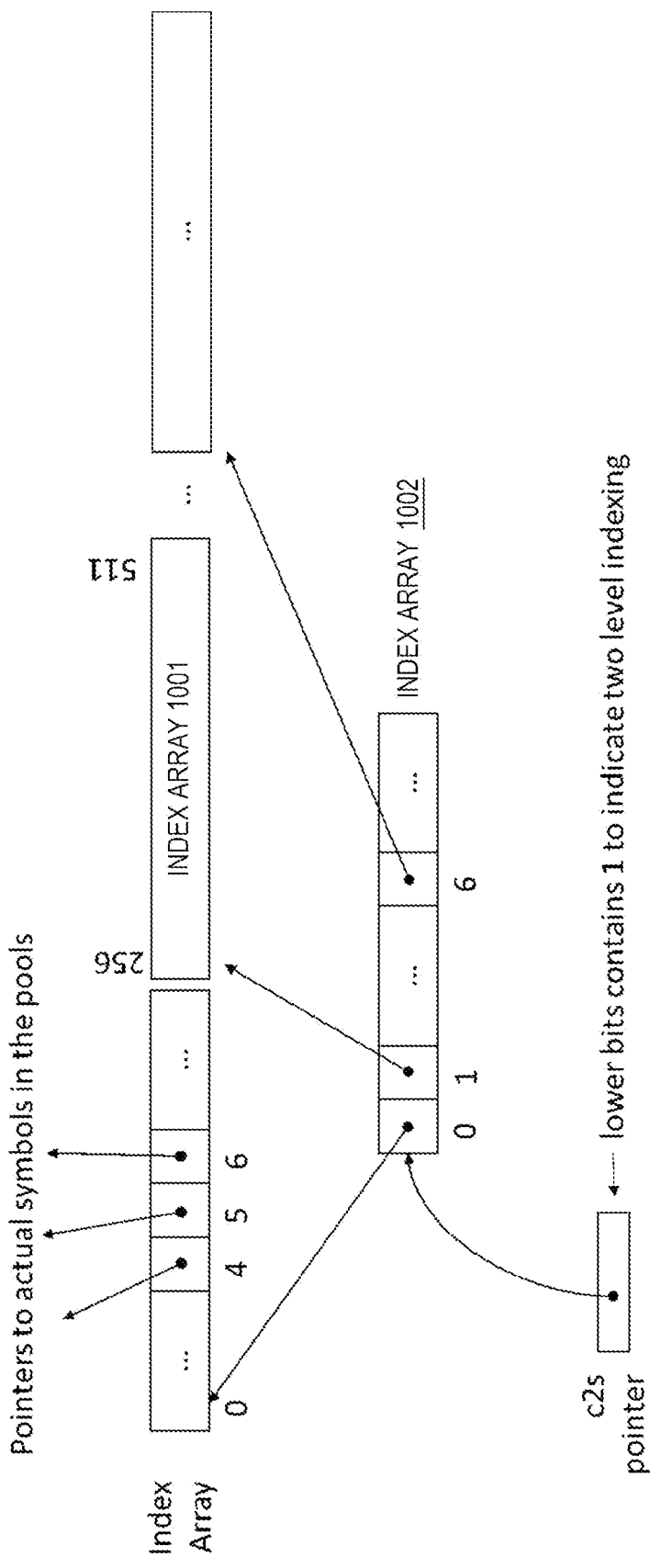
FIG. 10 is a block diagram that depicts an example indexer with two levels of index arrays.

FIG. 10 is a block diagram that depicts an example indexer with two levels of index arrays, in an embodiment. FIG. 10 is discussed with reference to previously presented figures.

The indexer shown in FIG. 10 may be the same indexer as FIG. 9 but later in its lifecycle. As FIG. 10 shows, the top row of index arrays has a leftmost index array, which may be the initial single index array of FIG. 9.

When the indexer transitions to a two level tree of index arrays upon insertion of a higher dense grouping key, index arrays 1001-1002 are added. The higher dense grouping key should have a value that is more or less immediately following a last value that was already inserted into the leftmost index array. In other words, overflow of one top row index array spills over into an adjacent new index array to the right.

In that way, the top row of index arrays operates as a segmented array that occasionally grows rightwards by one index array at a time when the previously added index array overflows. As a condition, overflow may be approximate instead of precise due to multithreaded dense key generation, per local DGK counters 390. For example, a first thread may race ahead of a second thread during generation and insertion of dense grouping keys such that the first thread begins filling the index array 1001 while the second thread is still filling the leftmost index array. Temporarily there may be a gap per lagging thread, each having a few empty elements in the leftmost index array or 1001. When the second thread catches up, its gap is filled.

When a new dense grouping key is inserted into the indexer, tree descent and pointer selection is based on portions of the dense grouping key, with each portion being used at a respective level of the tree. Selecting an element within an index array of the top row uses the same first portion of the dense grouping key that was discussed for FIG. 9. Thus, the leftmost index array uses the first portion regardless of which is the indexer's current lifecycle phase. Selecting an element within index array 1002 uses a second portion of the dense grouping key, which is unused in the indexer's initial lifecycle phase.

When the indexer transitions to a two level tree, which only happens once, index array 1002 is generated and becomes the tree root, which stores a different kind of pointer than other index arrays. Elements of index array 1002 store pointers that point to top row index arrays, not symbol pointers into symbol pools 330.

Initially, pointer c2s points to the leftmost index array. When index array 1002 is added, pointer c2s is reassigned to point to index array 1002. Pointer c2s is reassigned only and whenever the tree grows a new root hash table, which also is whenever the tree grows a new level.

Because the maximum amount of index arrays in a tree level depends on the distance of the level from the root, and because an existing level's depth shifts/increases by one when a new tree root is added, the maximum capacity of every shifted level increases whenever the tree grows a new root. Thus, a tree level that already grew a maximum amount of index arrays may, after shifting for a new root, again be able to grow more index arrays.

For example, the top row of index arrays always is the top row, regardless of tree depth, and like all other levels, the top row is again able to grow more index arrays when a new tree root is grown. Whenever a there is a new tree root, c2s is reassigned to point to the new root. Each reader or writer may reliably access all index arrays through pointer c2s regardless of which indexer lifecycle phase happens.

In an embodiment, each index array of the top row is hardware cache line aligned, even if an index array is wider than a cache line. In all levels other than the top row, indexer arrays need not be cache line aligned but, in an embodiment, are aligned at some bytes, such as on an eight byte boundary. Such alignments mean that least significant bits of pointer c2s may be: implied, and/or zero when the indexer has only the leftmost index array, and non-zero when index array 1002 is included. In an embodiment, the current lifecycle phase of the indexer is detected by checking those least significant bits of pointer c2s.

In an embodiment that has an intended relationship between index array cache alignment and generation of dense grouping keys per DGK counters 310 and 390 for multithreading, an index array may have portions containing a fixed amount of whole pointers that fits exactly into a cache line. Incrementation of global DGK counter 310 may be by that fixed amount, such that each cache line contains pointers that are to be assigned only by a same writing thread, thereby preventing contention on a cache line by many insertion threads.

11.0 Example Multithreading

Multithreading means that data structures of logical tree 500 of FIG. 5 and the indexer of FIGS. 9-10 may be contentious, which may be somewhat avoided as follows. Multithreaded acceleration by horizontal scaling with hyperthreading, more cores, and/or more CPUs may be contentious, which reduces throughput due to waiting on bucket locks and/or coherency latency between a local hardware cache and shared memory. In a single threaded uniprocessor embodiment, the single thread inserts grouping keys into all of: logical tree 500, symbol pools 330 of FIG. 3, and the indexer.

The work should saturate the uniprocessor because there is no contention, which inspires the following multithreaded design in which a master thread does most or all of the inserts, and the other threads dynamically pre-allocate memory objects needed to grow logical tree 500, symbol pools 330, and/or the indexer.

In an embodiment, symbol pools 330 may contain individual symbol pools of diverse sizes, including as small as one binding. In an embodiment, any free chunk of memory may be scavenged for repurposing as an individual symbol pool, even if small. This may reduce or eliminate a need for heap compaction.

In an embodiment, memory allocation may be slow due to operating system (OS) calls and/or heap management such as compaction, which would slow the master thread, which is why allocation may instead be performed by the other threads.

The master thread may execute a critical logic path whose average and worst case latencies should be low. Whereas, memory allocation latency may be somewhat unpredictable and should be kept out of the critical path by delegation to other threads.

In an embodiment, the other threads do the same work as the master, but slower because they also allocate memory. In an embodiment, master is a role that is transferable from one thread to another, such as back and forth or round robin or as follows. In an embodiment each thread, when not master, pre-allocates memory for its own future use.

In an embodiment while master, a thread does not allocate memory and uses only its own pre-allocated memory but not memory that was pre-allocated by other threads. Depending on the embodiment and when the master's own pre-allocations become exhausted: the master may steal another thread's pre-allocated memory, or another thread should become master. In an embodiment, a thread with the most unused pre-allocated memory or the oldest unused pre-allocation or the most recent unused pre-allocation becomes master.

In an embodiment, such switching of thread roles may occur before such thread memory exhaustion as follows. As explained earlier herein, each thread occasionally updates its own counter of local DGK counters 390 based on global DGK counter 310, which the thread increments by a fixed amount for all threads. When a thread races ahead, it may perform a threshold amount (e.g. two) of consecutive increments of global DGK counter 310 without an intervening increment by another thread.

When that happens, the racing thread should become the master. Conversely, the master might not have consecutive increments, which may happen a threshold amount (e.g. two) of times. When that happens, another thread should become master.

In an embodiment, when a master ceases being a master, a new master is selected. In an embodiment, no new master is immediately selected, until another thread eventually selects itself as a new master when some condition occurs. In an embodiment, simultaneous multiple masters and/or no masters may temporarily occur and are tolerated.

In an embodiment, a threshold amount of simultaneous multiple masters are encouraged. In an embodiment, any thread whose unused pre-allocations exceed a threshold becomes a master.

12.0 Exemplary High Performance Embodiment

The following is an exemplary high performance embodiment that may be an implementation of embodiments presented earlier herein. Features presented below as needed and/or precise are not necessarily requirements of embodiments presented earlier herein. The following exemplary embodiment demonstrates possible implementation choices.

In this embodiment, memory is allocated for two different structures: the hash tables and the symbol pools. Hash tables are always: the same size, cache line aligned, and can be released as soon as all dense grouping keys (DGKs) are generated (as they are no longer required). Symbol pools 330 of FIG. 3 does not require any special alignment, may have variable size, and usually are not released until the end of the database query that is currently executing. This embodiment does not directly allocate memory for the indexer array chunks, but instead takes space from symbol pools 330 to be used as indexer segments (a.k.a. index arrays) when required.

Sometimes a servicing process (e.g. computational thread) may decide to pre-allocate new (empty) hash tables or symbol pools. Thanks to pre-allocation of new structures, any process can make use of these pre-allocated structures without losing time for allocation and initialization. Other solutions allocate the structures at the moment they require such structures, usually when in possession of some lock that may prevent the progress of other processes.

Every process has its own symbol pool, for inserting new symbols without other processes interfering. If a servicing process is close to filling its own pool, it may decide to pre-allocate a new (empty) pool for local use. A process can also pre-allocate new hash tables. Unlike symbol pools, hash tables may have demand spikes with high allocation rates so processes should pre-allocate more than one hash table. The number of hash tables to pre-allocate is computed based on the known number of existing hash tables and DGKs. In a similar way to pre-allocation, servicing processes can modify the indexer structure so it can hold more codes, if it is close to the current indexer insertion limit.

To reduce contention in shared memory, every process keeps track of its own pre-allocated structures. However, it may happen that a process does not have pre-allocated structures and needs to take one from another process, which is especially so for the write-master (e.g. master thread), as it does not perform pre-allocations. To allow the transfer of pre-allocated structures between processes, a shared memory zone (called the sharing line) is enabled. The sharing line contains pointers to a global pre-allocated pool, to a global list of pre-allocated hash tables, and some other bookkeeping values.

When a process is executing servicing tasks, it detects if some of the pointers in the sharing line is null, and will try to fill them. If the global pre-allocated pool is null, the servicing process will transfer memory to it in three possible ways: a) split memory from its local pool (if it has enough free space), b) transfer its local pre-allocated pool, or c) immediately allocate a completely new pool. If the global list of pre-allocated hash tables is null, the servicing process will transfer its own local list of pre-allocated hash tables.

When a process needs to use a new structure (hash table or symbol pool) and it does not have the required structure locally pre-allocated, it may take the required structure from the global sharing line. In the case of hash tables, the write-master process will: a) take the whole list of pre-allocated tables, b) use the required one and, c) store the rest of the list locally. If a servicing process needs a table from the global sharing line, it will take only one. For symbol pools, it is very unlikely that a non-master process takes the pre-allocated symbol pool from the sharing line, because servicing processes pre-allocate pools when they are reaching the local pool limit.

The sharing line is checked for a null pointer every time a servicing process inserts a new symbol. As the modification rate of this line is low, it is typically shared among all the readers (servicing processes), and no write contention usually happens on it. The write master process will never access the line, unless it actually needs to take a pre-allocated structure in it, so write master(s) are not usually delayed.

Below are example special CPU instructions that are used in this exemplary embodiment, either for making the algorithm faster or for ensuring the logical correctness such as: a) multithreaded coordination and/or b) integrity and/or coherency of shared data.

Prefetching is for making insertion of a new symbol faster. Some cache lines in the symbol pools and indexer structures are prefetched for exclusive access by one process. Every time a new symbol is copied to the current process's pool, the next pool cache line is prefetched. Every time a process takes a new value from the global DGK counter, it prefetches the associated memory line in the indexer.

Single instruction multiple data (SIMD) CPU instructions are used to compare the discriminating key from the hash value against all the keys in the bucket at the same time.

Some CPUs have atomic instructions that are used to atomically modify values in shared locations, among then compare-and-swap (in Intel x86-64 such as Xeon, "lock cmpxchg"), Fetch-And-Add ("lock xadd"), atomic swap ("xchg"), and atomic increment ("lock inc").

Multicolumn aggregation is supported as follows. Sometimes, a SQL query performs aggregations grouped by more than one column. In these cases, this exemplary embodiment can compute DGKs independently for each column, and merge both DGK results in a single DGK result for the final aggregation.

13.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

7.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
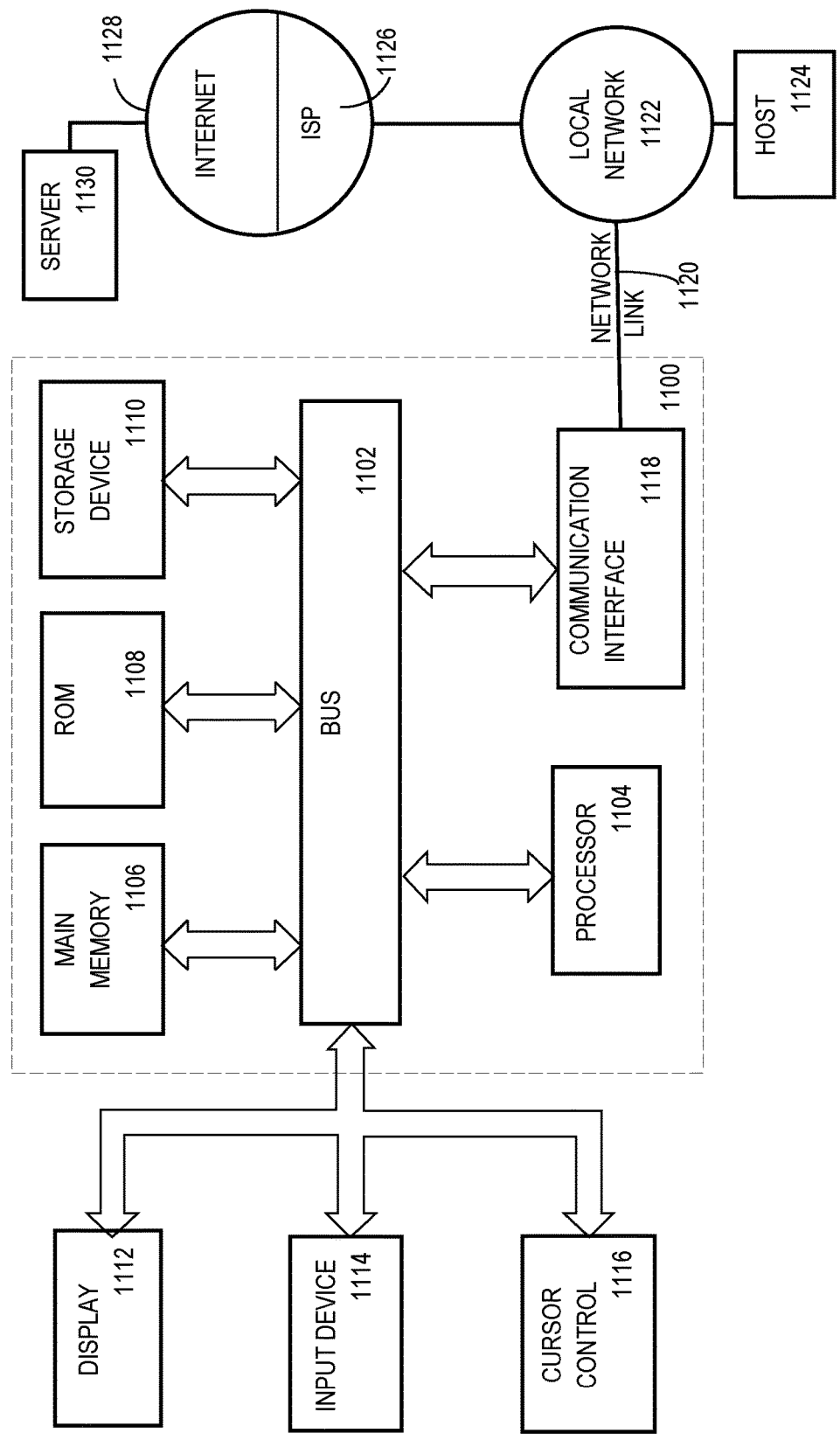
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

Figure 12:
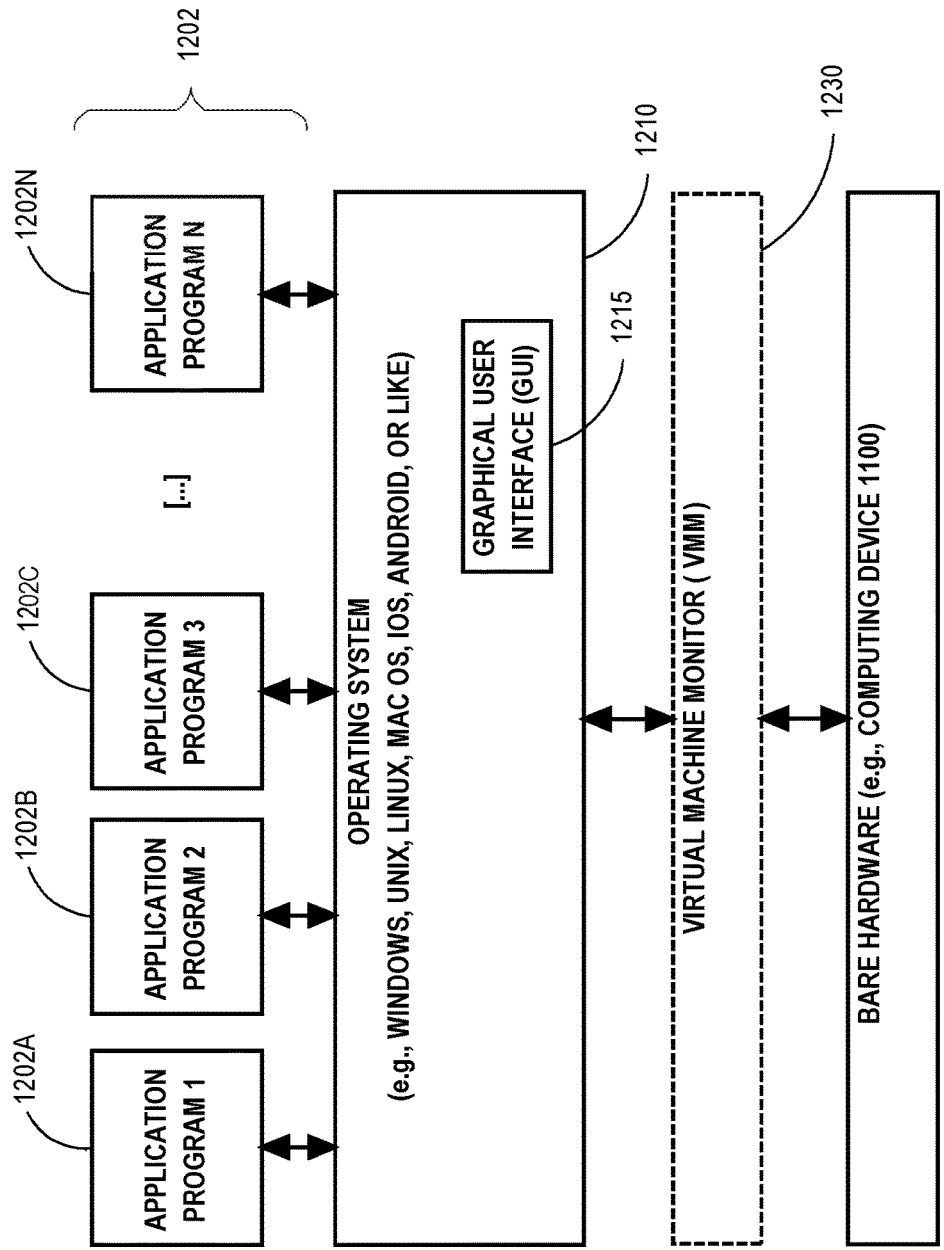
FIG. 12 is a block diagram that illustrates a basic software system that may be employed for controlling the operation of a computing system.

FIG. 12 is a block diagram of a basic software system 1200 that may be employed for controlling the operation of computing system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1200 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
calculating a hash code that represents a particular key value for an aggregation needed for a database request, wherein the hash code contains a first index bit field, a second index bit field, a first key bit field that contains the second index bit field, and a second key bit field;
selecting, based on the first index bit field in the hash code, a first particular bucket in a first hash table in a multilevel hash table that further contains a second hash table;
detecting that the first particular bucket in the first hash table in the multilevel hash table does not have capacity to store the first key bit field that contains the second index bit field;
selecting, based on the second index bit field in the hash code and the first particular bucket in the first hash table in the multilevel hash table, a second particular bucket in the second hash table in the multilevel hash table;

generating a result for the database request based on the second index bit field in the hash code and the second particular bucket in the second hash table in the multilevel hash table.

2. The method of claim 1 wherein the first key bit field contains more bits than the second key bit field.

3. The method of claim 1 wherein:
the first particular bucket and the second particular bucket have a same width;
the first particular bucket and the second particular bucket have different respective internal formats.

4. The method of claim 3 wherein said different respective internal formats comprises the first particular bucket can store fewer than the second particular bucket of at least one selected from a group consisting of: key prefixes, offset values, and pointer suffixes.

5. The method of claim 3 wherein said different respective internal formats comprises the first particular bucket contains larger than the second particular bucket of at least one selected from a group consisting of: key prefixes, and a pointer base.

6. The method of claim 3 wherein:
a third particular bucket in a third hash table in the multilevel hash table has a same width and internal format as the second particular bucket;
the first hash table, the second hash table, and the third hash table are in different respective levels of the multilevel hash table.

7. The method of claim 1 wherein:
adding a new hash table to the multilevel hash table never causes the first hash table to change levels in the multilevel hash table;
said adding said new hash table to the multilevel hash table never causes the second hash table to change levels in the multilevel hash table.

8. The method of claim 1 wherein:
the first particular bucket contains only one hash table pointer;
said only one hash table pointer points to the second hash table;
the second particular bucket contains at most one hash table pointer.

9. The method of claim 8 wherein said only one hash table pointer that points to the second hash table cannot be reassigned.

10. The method of claim 1 wherein the multilevel hash table cannot rebalance.

11. One or more non-transitory computer-readable media storing instructions that, when executed by one or more processors, cause:
calculating a hash code that represents a particular key value for an aggregation needed for a database request, wherein the hash code contains a first index bit field, a second index bit field, a first key bit field that contains the second index bit field, and a second key bit field;
selecting, based on the first index bit field in the hash code, a first particular bucket in a first hash table in a multilevel hash table that further contains a second hash table;
detecting that the first particular bucket in the first hash table in the multilevel hash table does not have capacity to store the first key bit field that contains the second index bit field;
selecting, based on the second index bit field in the hash code and the first particular bucket in the first hash table in the multilevel hash table, a second particular bucket in the second hash table in the multilevel hash table;
generating a result for the database request based on the second index bit field in the hash code and the second particular bucket in the second hash table in the multilevel hash table.

12. The one or more non-transitory computer-readable media of claim 11 wherein the first key bit field contains more bits than the second key bit field.

13. The one or more non-transitory computer-readable media of claim 11 wherein:
the first particular bucket and the second particular bucket have a same width;
the first particular bucket and the second particular bucket have different respective internal formats.

14. The one or more non-transitory computer-readable media of claim 13 wherein said different respective internal formats comprises the first particular bucket can store fewer than the second particular bucket of at least one selected from a group consisting of: key prefixes, offset values, and pointer suffixes.

15. The one or more non-transitory computer-readable media of claim 13 wherein said different respective internal formats comprises the first particular bucket contains larger than the second particular bucket of at least one selected from a group consisting of: key prefixes, and a pointer base.

16. The one or more non-transitory computer-readable media of claim 13 wherein:
a third particular bucket in a third hash table in the multilevel hash table has a same width and internal format as the second particular bucket;
the first hash table, the second hash table, and the third hash table are in different respective levels of the multilevel hash table.

17. The one or more non-transitory computer-readable media of claim 11 wherein:
adding a new hash table to the multilevel hash table never causes the first hash table to change levels in the multilevel hash table;
said adding said new hash table to the multilevel hash table never causes the second hash table to change levels in the multilevel hash table.

18. The one or more non-transitory computer-readable media of claim 11 wherein:
the first particular bucket contains only one hash table pointer;
said only one hash table pointer points to the second hash table;
the second particular bucket contains at most one hash table pointer.

19. The one or more non-transitory computer-readable media of claim 18 wherein said only one hash table pointer that points to the second hash table cannot be reassigned.

20. The one or more non-transitory computer-readable media of claim 11 wherein the multilevel hash table cannot rebalance.

* * * * *